(12) United States Patent
Branda et al.

(10) Patent No.: US 8,478,738 B2
(45) Date of Patent: Jul. 2, 2013

(54) OBJECT DEALLOCATION SYSTEM AND METHOD

(75) Inventors: Steven Joseph Branda, Rochester, MN (US); William T. Newport, Rochester, MN (US); John Joseph Stecher, Rochester, MN (US); Robert E. Wisniewski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 11/953,234

(22) Filed: Dec. 10, 2007

(65) Prior Publication Data

US 2009/0150465 A1   Jun. 11, 2009

(51) Int. Cl.
*G06F 12/00* (2006.01)
*G06F 17/30* (2006.01)

(52) U.S. Cl.
USPC .......................................... 707/714; 707/720

(58) Field of Classification Search
USPC ........................ 707/813, 814, 816, 818, 820
See application file for complete search history.

(56) References Cited

U.S. PATENT DOCUMENTS

| | | | | |
|---|---|---|---|---|
| 5,819,043 A * | 10/1998 | Baugher et al. | | 709/222 |
| 6,308,185 B1 * | 10/2001 | Grarup et al. | | 1/1 |
| 6,321,240 B1 * | 11/2001 | Chilimbi et al. | | 1/1 |
| 6,446,188 B1 * | 9/2002 | Henderson et al. | | 711/206 |
| 6,457,023 B1 * | 9/2002 | Pinter et al. | | 1/1 |
| 6,510,504 B2 * | 1/2003 | Satyanarayanan | | 711/170 |
| 6,910,213 B1 * | 6/2005 | Hirono et al. | | 718/108 |
| 7,337,201 B1 * | 2/2008 | Yellin et al. | | 1/1 |
| 2002/0073097 A1 * | 6/2002 | Sokolov et al. | | 707/103 R |
| 2002/0087590 A1 * | 7/2002 | Bacon et al. | | 707/206 |
| 2004/0181782 A1 * | 9/2004 | Findeisen | | 717/130 |
| 2009/0030959 A1 * | 1/2009 | Beard | | 707/206 |

* cited by examiner

*Primary Examiner* — Usmaan Saeed
*Assistant Examiner* — MD. I Uddin
(74) *Attorney, Agent, or Firm* — Toler Law Group (57) ABSTRACT

A method, apparatus and program product deallocate an object from a memory heap in a virtual machine environment by, in part, determining that the object is replaceable using an object reference associated with the object. The object may additionally be automatically determined as being properly removable by using a value indicative of a number of object references associated with the object. Where these conditions are met, the object may be removed from the memory heap. Where a new object can fit into a space within the memory from which the object was removed, the new object may be automatically allocated into the space. The object may be designated as being replaceable using automated or manual processes. A garbage collector algorithm may additionally execute, as needed.

20 Claims, 3 Drawing Sheets

OBJECT DEALLOCATION SYSTEM AND METHOD

FIELD OF THE INVENTION

The invention generally relates to computers and computer software. More specifically, the invention relates to the management of data structures and functions in an object oriented programming system.

BACKGROUND OF THE INVENTION

Managing available memory is critically important to the performance and reliability of a computer system. Such systems must store vast quantities of data within limited memory address space. Data is commonly stored in the form of objects. Memory space allocated for an object is known as an object heap. Typically each computer program has its own object heap.

Objects comprise both data structures and operations, known collectively as methods. Methods access and manipulate data structures. Objects having identical data structures and common behavior can be grouped together into classes. Each object inherits the data structure and methods of the particular class from which it was instantiated. Further, a hierarchical inheritance relationship exists between multiple classes. For example, one class may be considered a parent of another, child class. The child class is said to be derived from the parent class and thus, inherits all of the attributes and methods of the parent class.

Object structure includes data and object reference fields. Object references may contain the memory addresses or other information associated with other memory locations and objects. The object 10 of FIG. 1 has an identifier field 12; data field/item 14 and object references 16, 18. In some applications, object references are referred to as pointers. The identifier field 12 contains processing instructions used only when the object 10 is compiled, so it is not necessarily stored with the object 10. Dashes distinguish the identifier field 12 from information stored at run time.

Figure 1:
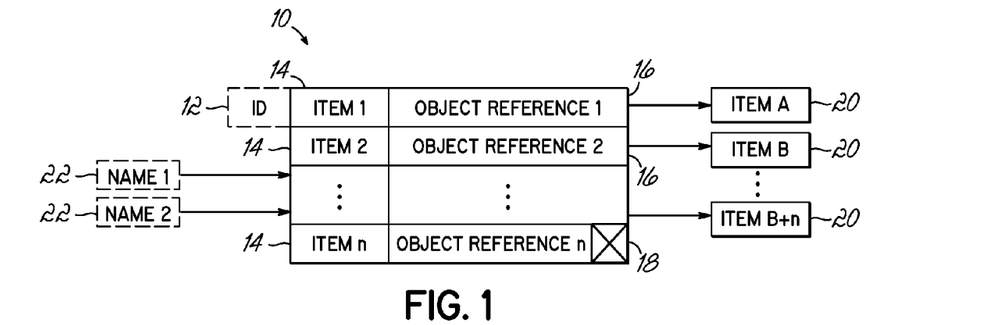
FIG. 1 represents an object executable by embodiments of the present invention.

In FIG. 1, object references 16 are represented as arrows pointing to other objects 20. That is, the object reference 16 may comprise a pointer, which in turn, may include an actual memory address where an object is located within the object heap. A null value of object reference 18 is represented by an "X" within the corresponding field. Items 14 are contained by the object 10 and are referred to as internal objects, while objects 20 referenced by the object's 10 object references 16 are known as external objects.

The exemplary object 10 also has names 22 associated with it. Each name may comprise a labeled pointer to the object. Since names are only used by the compiler at compile time, they do not require any storage at run time. This fact is represented by the use of dashed boxes to enclose the name pointers. Note that external objects can also contain pointers to other objects recursively, creating an object with arbitrary depth.

The depth of an object is determined by counting the number of object references that must be followed to reach it, starting from a name. In FIG. 1, names 22 are at depth 0, and the object 10 is at depth 1. The external objects 20 are at depth 2. For consistency, the depth attributed to the manipulation of an object reference corresponds to the depth at which the object reference is stored. Thus, manipulations of object references 16 as shown in FIG. 1 are considered to be at depth 1.

Whenever a program creates a new object, available memory is reserved using a process known as memory allocation. The Java programming environment is one example of a programming framework that utilizes memory allocation. Given the limited amount of memory available in such an environment, it is important to deallocate memory reserved for data no longer in use. Otherwise, system performance will suffer as available memory is consumed.

A computer program known as a garbage collector empties unused memory that has been allocated by other programs. Generally, a garbage collection algorithm carries out storage management by automatically reclaiming storage. Garbage collectors are typically activated when an object heap becomes full. Garbage collection algorithms commonly determine if an object is no longer reachable by an executing program. A properly collectable object is unreachable either directly or through a chain of pointers.

Thus, the garbage collector must identify pointers directly accessible to the executing program. Further, the collector must identify references contained within that object, allowing the garbage collector to transitively trace chains of pointers. When the data structure of an object is deemed unreachable, the garbage collector reclaims memory. The memory is deallocated even if it has not been explicitly designated by the program.

Specific methods for memory reclamation include reference counting, mark-scan and copying garbage collection. In reference counting collection, each external object is associated with a count reflecting the number of objects that point to it. Every time a new pointer implicates an external object, the count is incremented. Conversely, the count is decremented every time an existing reference is destroyed. When the count goes to zero, the object and its associated count are deallocated.

A variation of the reference counting scheme, known as weighted reference counting, removes the requirement of referencing shared memory, but some bookkeeping is still required at run time. Another variation, known as lazy reference counting, reduces the run-time CPU requirements by deferring deallocation operations and then combining them with allocations, but does not eliminate them entirely.

An alternative method, mark-scan garbage collection, never explicitly deallocates external objects. Periodically, the garbage collection process marks all data blocks that can be accessed by any object. Unreachable memory is reclaimed by scanning the entire memory and deallocating unmarked elements.

Each cycle of the mark-scan algorithm sequentially operates in mark and sweep stages. In the mark stage, the collector scans through an object heap beginning at its roots, and attempts to mark objects that are still reachable from a root. Objects deemed reachable if it is referenced directly by a root or by a chain of objects reachable from a root. In the sweep stage, the collector scans through the objects and deallocates any memory reserved for objects that are unmarked as of completion of the mark stage. Some variations of mark-scan require that active program threads be halted during collection, while others operate concurrently.

Copying garbage collectors are similar to those of the mark-scan variety. However, instead of marking those items that can be reached by reference, all reachable data structures are periodically copied from one memory space into another. The first memory space can then be reclaimed in its entirety. A specific implementation of a copying garbage collector is a generational garbage collector, which partitions an object heap into new and old partitions. A generational garbage collector relies on a tendency for newer objects to cease to be used more frequently than older objects. Put another way, as an object is used over time, it becomes less and less likely that the object will cease being used.

One of the most efficient types of garbage collectors is a generational garbage collector. In a generational garbage collector, new objects are allocated in a young generation area of the heap. If an object continues to have references over a specified number of garbage collections cycles, the object is promoted to one or more old generation areas of the heap. A generational garbage collector performs garbage collection frequently on the young generation area of the heap, while performing garbage collection less frequently on old, or tenured, generation areas. This technique strives to match typical program behavior in that most newly created objects are short-lived, and are thus reclaimed during garbage collection of the young generation. Long-lived objects in the old generation areas tend to persist in memory. Hence, the old generation areas need to be garbage collected less frequently. This greatly reduces the effort involved in garbage collection because only the young generation area of the heap needs to be garbage collected frequently.

Despite the progresses afforded by the above garbage collection techniques, obstacles to memory management remain. One particular area of concern relates to processing delays attributable to garbage collectors. System performance must typically be interrupted, or paused, while a garbage collector executes. Associated delays of a second or more can severely degrade system performance. Such scenarios become exacerbated where extremely large caches are involved. For instance, a Java Virtual Machine, or JVM, routinely include larger caches (larger than four gigabytes) that must be frequently updated and modified. Conventional JVM garbage collection models incur massive and unacceptable response time drop-offs as objects are updated in the cache sitting in the old space. It may take an unacceptable amount of time to promote the object from the new space to the old space. Long delays may additionally be suffered as the corresponding old object is garbage collected from the tenured heap, which may be larger than four gigabytes.

For at least the above reasons, there exists a need for an improved manner of managing stored objects, and more particularly, for deallocating objects from memory.

SUMMARY OF THE INVENTION

The present invention provides an improved computer implemented method, apparatus and program product for deallocating an object in a memory heap by, in part, determining that the object is replaceable using an object reference associated with the object. Aspects of the invention may additionally determine that the object is properly removable using a value indicative of a number of object references associated with the object, and may remove the object from the memory heap.

Features of the present invention may additionally determine that a new object can fit into a space within the memory from which the object was removed. Accordingly, aspects of the invention may allocate the new object into the space within the memory heap from which the object was removed.

According to at least one embodiment that is consistent with the principles of the present invention, program code and associated processes may automatically determine that the object is replaceable. For instance, aspects of the invention may determine that the object meets a programmed criterion. Alternatively, a user may manually tag the object reference to designate the object as replaceable.

An object may be properly removable in accordance with the underlying principles of the invention when less than two object references are associated with the object. In another or the same embodiment, the object may be properly removable when the object is at least one of dead, or can be removed without substantially hurting system performance.

Other aspects of the invention may execute a garbage collector algorithm on other objects within the memory. Where so configured, embodiments of the invention may execute within a virtual machine environment.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

DETAILED DESCRIPTION

Embodiments consistent with the present invention may offer a more proactive approach to managing objects in a manner that minimizes the number of garbage collections. Put another way, features of the present invention may reduce processing interruptions by working with, but minimizing the use of conventional garbage collection algorithms. One embodiment may allow developers to use an annotation to explicitly control the removal of an object from an old space. Another embodiment may automatically determine replaceable objects by enabling the system to learn and detect caching patterns based on analysis of accessing codes and patterns.

An embodiment consistent with underlying principles of the invention may include an annotating key, or tag, configured to designate an object as being replaceable. When an object is annotated with such a tag, a JVM may detect, via extending already existing internal mechanisms, when the pointer to the object is pointing to a new object (much like a cache update). The JVM may then automatically remove the old object from the heap by performing a quick sweep/clean of the memory. By performing this process, embodiments may be able to decrease garbage collections in the old space, and thus get more constant performance from the application. Object compaction may be factored in to run every so often to ensure large enough contiguous spaces for new or different objects to be allocated.

Another embodiment may use JVM-based code profiling. The JVM may be put into a large cache mode during which the old space may be monitored to detect cache-like behavior of objects. This may be accomplished by looking for common caching data structures. The JVM may also monitor object references to see how frequently they are read, and how frequently the object they point to is replaced. When an object pointer is detected as pointing to a replaceable object, the object pointer may be tagged internally and every object that it references in the future may be automatically sweep/cleaned before being replaced with the updated object.

Aspects of the invention may thus internally tag an object as being replaceable. The JVM may monitor the object reference, and when a change is requested for the object it points to, the JVM may invoke a sweep/clean method on the old object if nothing else points to it. The JVM may attempt to place the new/updated object into that space. If the new object does not fit, the JVM may go back and request regular space from the heap. The free space from the sweep may then be available for other objects.

Embodiments of the present invention have achieved unexpected success in significantly decreasing interruptions to garbage collection that conventionally plague large memory systems. The features may thus allow applications to meet service demands placed on it by businesses and give more consistent response times for applications. In this manner, embodiments consistent with the underlying principles of the present invention complement conventional garbage collection practices by reducing the number of collections.

Hardware Environment

Figure 2:
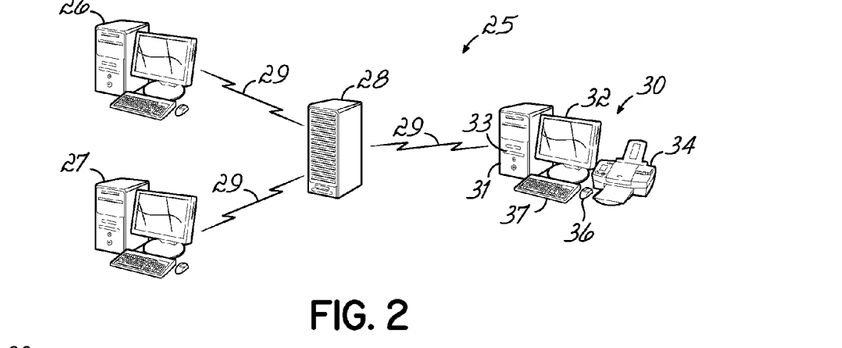
FIG. 2 is a networked computer system configured to deallocate objects from memory in a manner that is consistent with embodiments of the invention.

Turning to the Drawings, wherein like numbers denote like parts throughout the several views, FIG. 2 illustrates a computer system 25 configured to deallocate objects from memory in a manner that is consistent with embodiments of the invention. The computer system 25 is illustrated as a networked computer system including one or more client computer systems 26, 27 and 30 (e.g., desktop or personal computers, workstations, etc.) coupled to a server 28 through a network 29.

The network 29 may represent practically any type of networked interconnection, including but not limited to local area, wide area, wireless, and public networks, including the Internet. Moreover, any number of computers and other devices may be networked through the network 29, e.g., multiple servers. Furthermore, it should be appreciated that aspects of the invention may be realized by stand-alone computers and associated devices.

Computer system 30, which may be similar to computer systems 26, 27, may include one or more processors, such as a microprocessor 31. The system may also include a number of peripheral components, such as a computer display 32 (e.g., a CRT, an LCD display or other display device), and mass storage devices 33, such as hard, floppy, and/or CD-ROM disk drives. As shown in FIG. 2, the computer system 30 also includes a printer 34 and various user input devices, such as a mouse 36 and keyboard 37, among others. Computer system 30 operates under the control of an operating system, and executes various computer software applications, programs, objects, modules, etc. Moreover, various applications, programs, objects, modules, etc. may also execute on one or more processors in server 28 or other computer systems 26, 27, such as a distributed computing environment.

It should be appreciated that the various software components may also be resident on, and may execute on, other computers coupled to the computer system 25. Specifically, one particularly useful implementation of an execution module consistent with the invention is executed in a server such as a System i minicomputer system available from International Business Machines Corporation. It should be appreciated that other software environments may be utilized in the alternative.

In general, the routines executed to implement the illustrated embodiments of the invention, whether implemented as part of an operating system or a specific application, program, object, module or sequence of instructions, may be referred to herein as computer programs, algorithms, or program code. The computer programs typically comprise instructions that, when read and executed by one or more processors in the devices or systems in computer system 30, cause those devices or systems to perform the steps necessary to execute steps or elements embodying the various aspects of the invention.

Moreover, while the invention has and hereinafter will be described in the context of fully functioning computer systems, those skilled in the art will appreciate that the various embodiments of the invention are capable of being distributed as a program product in a variety of forms. The invention applies equally regardless of the particular type of computer readable signal bearing media used to actually carry out the distribution. Examples of signal bearing media comprise, but are not limited to recordable type media and transmission type media. Examples of recordable type media include volatile and non-volatile memory devices, floppy and other removable disks, hard disk drives, magnetic tape, and optical disks (CD-ROMs, DVDs, etc.). Examples of transmission type media include digital and analog communication links.

Software Environment

Figure 3:
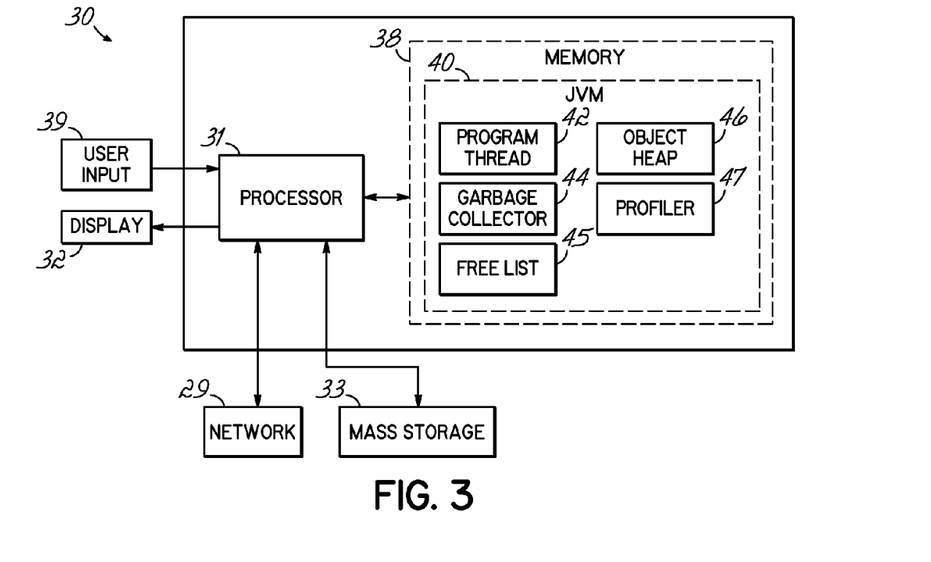
FIG. 3 is a block diagram of an exemplary hardware and software environment for a computer from the networked computer system of FIG. 2.

FIG. 3 illustrates a suitable software environment for computer system 30 consistent with the invention. A processor 31 is shown coupled to a memory 38, as well as to several inputs and outputs. For example, user input may be received by processor 31, e.g., by a mouse 36 and a keyboard 37, among other input devices. Additional information may be passed between the computer system 30 and other computer systems in the networked computer system 25 via the network 29. Additional information may be stored to and/or received from mass storage 33. The processor 31 also may output data to the computer display 32. It should be appreciated that the computer system 30 includes suitable interfaces between the processor 31 and each of the components 29, 32, 33, 36, 37 and 38, as is well known in the art.

A JVM 40 may reside in the memory 38, and is configured to execute program code on processor 31. In general, a virtual machine is an abstract computing machine. Instructions to a physical machine ordinarily conform to the native language of the hardware, itself. In other cases, the instructions control a software-based computer program referred to as the virtual machine, which in turn, controls the physical machine. Instructions to a virtual machine ordinarily conform to the virtual machine language. For instance, bytecodes represent a form of the program recognized by the JVM 40, i.e., virtual machine language. As known by one of skill in the art, the JVM 40 is only one of many virtual machines. Most any interpreted language used in accordance with the underlying principles of the present invention may be said to employ a virtual machine. The MATLAB program, for example, behaves like an interpretive program by conveying the user's instructions to software written in a high-level language, rather than to the hardware.

As shown in FIG. 3, the JVM 40 may execute one or more program threads 42, as well as a garbage collector algorithm 44 that is used to deallocate unused data stored in an object heap 46. The JVM 40 may also include a freelist 45 used for allocation, and a profiler algorithm 47.

Object-oriented programming systems typically allocate objects from the object heap 46. When an object 10 becomes unreachable, because all object references 16 to the object 10 have been removed, the object 10 can no longer be used.

However, the object 10 continues to occupy memory space within the object heap 46. At a later time, a garbage collector algorithm 44 may reclaim this unused memory and make it available to accommodate other objects. This garbage collector algorithm may additionally perform compaction by rearranging objects in the heap to reduce memory fragmentation.

More particularly, when the JVM 40 goes into a garbage collection, the garbage collector algorithm 44 may examine the roots, or live method stack frames, and follow applicable object references 16 off of the stack frames. Any object 10 that is found to have a negotiable path off of those roots may be considered to be a live object. Conversely, any object 10 for which the JVM 40 was not able to negotiate a path off of the roots may be considered a dead object, and removable. Space that the garbage collector algorithm 44 identifies as relating to dead objects may be reclaimed. Tenured space may slowly degrade away and eventually force a full system garbage collection. A full garbage collection can take a second or more.

The profiler algorithm 47 may be used to capture events and other statistical information about executing program code. For example, the profiler algorithm 47 may include an API used to capture information regarding memory and other resource usage for the purpose of identifying potential memory leaks, garbage collection problems, or other circumstances that may lead to excessive consumption of system resources. As another example, the profiler algorithm 47 may be used to capture information such as the time spent in various routines, the number of instances created for certain object classes, and the state of a call stack for the purpose of identifying particular sections of program code that perform sub-optimally. Profiling may be performed by instrumenting program code prior to compilation, or alternatively, a runtime environment may support data collection capabilities to capture relevant profiling information for uninstrumented program code. Profiling may be utilized in a number of computer environments. As shown in FIG. 3, profiling may be utilized for profiling program code executing within the JVM 40.

The freelist 45 typically points to a first free space of memory on the object heap 46. The places on the object heap 46 that are filled with objects 10 are referenced by object references 16. Each area of free storage may have a size field and an object reference 16 that points to the next free space. The free spaces may be addressed in order. The last free space may have a null pointer. The JVM 40 may use the freelist 45 to manage free space on the object heap 46, so that the JVM 40 knows where it can allocate new objects.

Aspects of the invention may allow objects to be allocated in a different area than where the freelist 45 points. That is, instead of having to allocate cache objects off of the freelist 45, embodiments consistent with the invention may replace the objects that were in the space that is being cleared, so long as there is enough space to contain the object that is being allocated.

The JVM 40 is aware of the size of an object that is about to be allocated. Embodiments consistent with the invention allow the JVM 40 to use this knowledge to more efficiently and effectively allocate new objects into replaceable memory 38. Embodiments consistent with the present invention thus offer a more proactive approach to managing objects in a manner that minimizes the number of garbage collections. The JVM 40 is aware of the objects in the object heap 46, as well as how heap allocations are taking place. The JVM 40 may capitalize on this knowledge to exert additional control over the object heap 46 and associated processes.

The JVM 40 may be resident as a component of the operating system of computer system 30, or in the alternative, may be implemented as a separate application that executes on top of an operating system. Furthermore, any of the JVM 40, program thread 42, garbage collector algorithm 44, freelist 45, object heap 46 and profiler algorithm 47 may, at different times, be resident in whole or in part in any of the memory 38, mass storage 33, network 29, or within registers and/or caches in processor 31.

While aspects of the present invention may lend themselves particularly well to use in connection with a JVM 40, it should be understood that features of the present invention may have application in other object oriented computing systems. Those skilled in the art will recognize that the exemplary environments illustrated in FIGS. 2 and 3 are not intended to limit the present invention. Indeed, those skilled in the art will recognize that other alternative hardware environments may be used without departing from the scope of the invention.

Object Deallocation Processes

Figure 4:
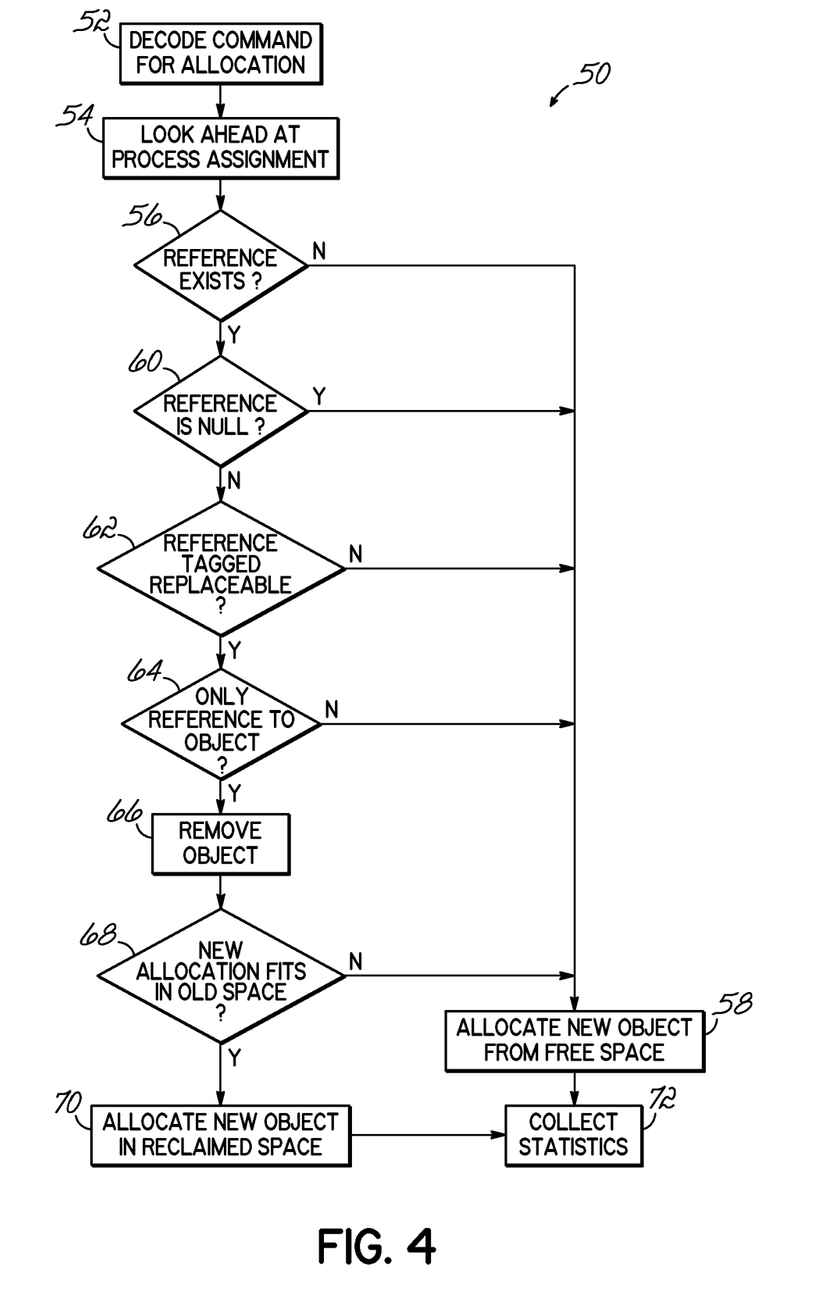
FIG. 4 is a flowchart having steps executable by the JVM of FIG. 3 for concurrently allocating and deallocating respective objects in accordance with the principles of the present invention.

The invention calls for the JVM 40 of FIG. 3 to cycle through an instruction sequence represented by the flowchart 50 of FIG. 4. The sequence of steps may be used to concurrently allocate and deallocate objects in accordance with the principles of the present invention.

Turning more particularly to the steps of the flowchart 50, the JVM 40 may decode at block 52 a command for object allocation. Object allocation includes a process where the JVM 40 creates binary data and places an object 10 on the object heap 46. At block 54, the JVM 40 may look ahead and find a corresponding assignment statement. An assignment may occur when an object reference 16 is updated to point to a particular object. The assignment may reference the object 10, as well as any replaceable annotation, or tag, which may be associated with the object 10.

At block 56, the JVM 40 may check to see if an object reference 16 exists, or has been initialized. In other words, the JVM 40 may determine at block 56 whether a pointer to an object 10 may be found on the object heap 46. If not, then the object reference 16 will not point to any data on the object heap 46, and the JVM 40 may default to normal allocation algorithms and processes at block 58. That is, the JVM 40 may allocate a new object from the free space on the object heap 46 at block 58.

If the object reference does exist at block 56, then the JVM 40 may check at block 60 to see if the object reference 18 value is null. If so, then the JVM 40 may allocate a new object from the free space on the object heap 46 at block 58.

Alternatively, where the object reference 16 is not null at block 60, then the JVM 40 may determine at block 62 if the object reference 16 is tagged or otherwise designated as being replaceable. Object references 16 may be manually or automatically tagged as being replaceable. For instance, a programmer may annotate program code associated with the object 10 as being replaceable. Alternately, automated processes may determine whether an object 10 should be tagged as being replaceable based on criteria and characteristics of the object.

Should the object reference 16 not be tagged as being replaceable at block 62, the JVM 40 may allocate a new object from the free space at block 58.

Where the object reference 16 is alternately tagged replaceable at block 62, then the JVM 40 may determine at block 64 if the object reference 16 is the only reference to the object 10 currently on the object heap 46. Processes of another embodiment may use other criteria or the same criteria to determine that the object currently on the object heap 46 is useless and dead, and could be removed without substantially hurting system performance, i.e., properly removable. In this manner, aspects of the invention may avoid removing or replacing objects when another part of a program may not be expecting the object to be replaced or changed. Those skilled in the art will appreciate that there are a number of known mechanisms for counting or otherwise determining pointers that reference an object. If the object 10 is determined to be properly removable, then the JVM 40 may remove at block 66 the old object 10 from the object heap 46.

The JVM 40 may determine at block 68 if the new object 10 to be allocated can fit in the newly deallocated space of the object heap 46. If not, then the JVM 40 may allocate at block 58 the new object 10 from the free space on the object heap 46.

Alternatively, where the new object allocation will fit in the deallocated space, the JVM 40 may allocate at block 70 the new object 10 into the reclaimed space. The JVM 40 may then initiate profiling processes at block 72 to collect relevant statistics using the profiler algorithm 47.

Figure 5:
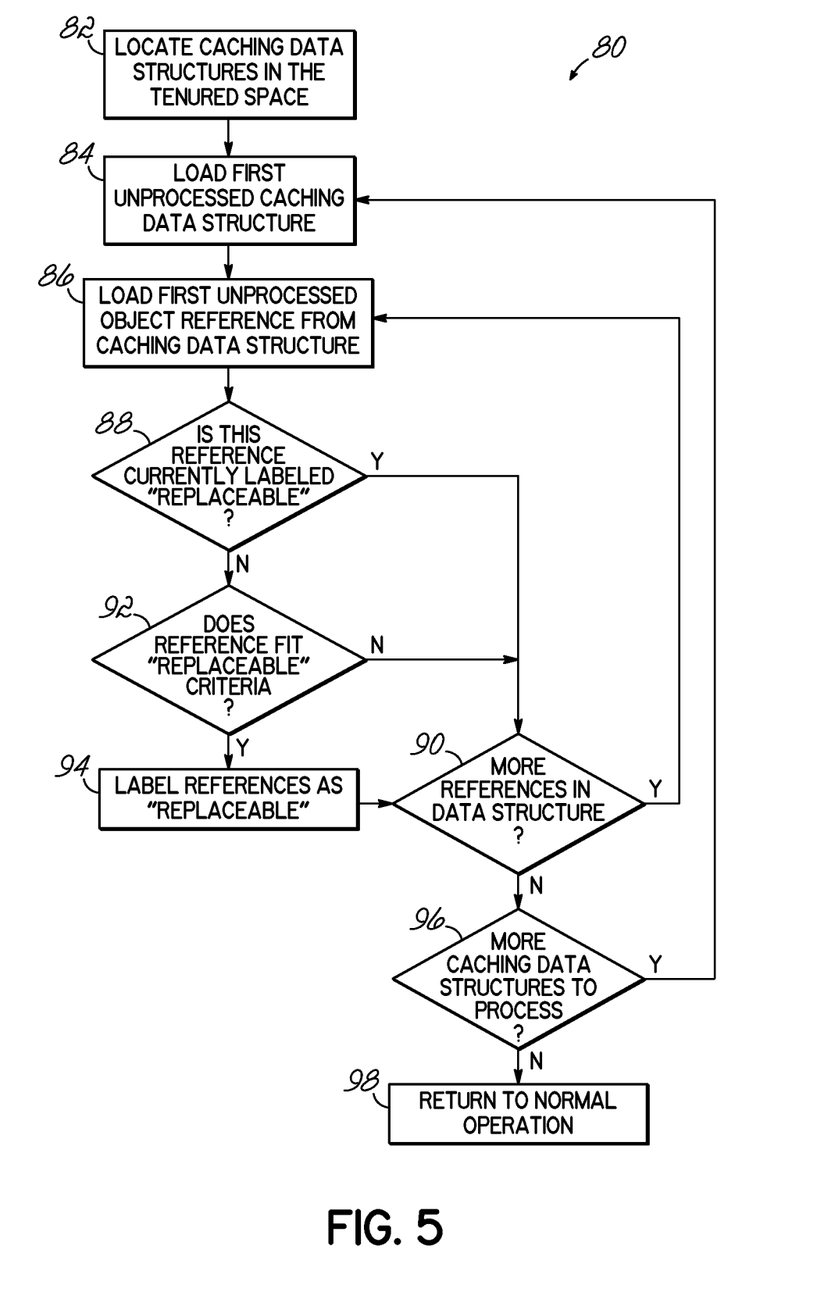
FIG. 5 is a flowchart having steps executable by the JVM of FIG. 3 for automatically designating an object as being replaceable.

The flowchart 80 of FIG. 5 includes processes executable by the JVM 40 of FIG. 3 for automatically designating an object as being replaceable. At block 82, the JVM 40 may locate caching data structures in tenured space. After locating one at block 82, the JVM 40 may load at block 84 a first unprocessed caching data structure.

The JVM 40 may then load at block 86 a first unprocessed object reference 16 from the located caching data structure. The JVM 40 may determine at block 88 if the object reference 16 is currently labeled as being replaceable. If so, the JVM 40 may determine if there are additional object references 16 available at block 90 prior to loading a subsequent object reference 16 at block 86.

In an alternative embodiment, a data structure may be tagged so that it is not redundantly processed. For example, if the JVM 40 determines that a data structure has some percentage of objects that are already marked as being replaceable, then the JVM 40 may move on to another data structure. This screening process may decrease the overhead of the profiling process. If a data structure has been tagged, then the JVM 40 does not need to expend processing confirming that the object reference 16 has been marked as replaceable.

Alternatively at block 88, if the object reference 16 is currently not labeled as being replaceable, then the JVM 40 may automatically determine at block 92 if the object reference 16 fits replaceable criteria. For this purpose, the JVM 40 may use profiler algorithms 47 to designate objects as being replaceable without relying on the developer to do it. The JVM 40 may use trend and other statistical information to determine when an object reference 16 should be tagged as replaceable. For instance, certain embodiments may recognize particular usages of some objects that are known to be part of a Java API. Another embodiment may determine live bytes by the number of roots. For instance, there may be 12 or 13 roots inside of a JVM 40, and the associated cache may be massive. There may be one root that would not necessarily be using the search. Such automatic analysis may lead to determining probable caches, for instance. In another example, the JVM 40 may look at statistics and determine if an object reference 16 has been assigned to an object 10 a number of times. If so, the JVM 40 may assume/determine that the object is likely part of cache, and that it is replaceable. In another embodiment, the JVM 40 may mark an object as being replaceable based upon a combination of the object having no subclasses, and based upon the object's object reference 16 being associated with a type of object that has been assigned a number of times.

If the object reference 16 does not fit replaceable criteria at block 92, then the JVM 40 may determine (as above) that there is no work to be done regarding tagging the object as being replaceable. The JVM 40 may consequently determine at block 90 if additional object references 16 are present in the data structure.

If the referenced object 10 alternatively fits the replaceable criteria as determined at block 92, then the JVM 40 may label at block 94 the object reference 16 as being replaceable. The JVM 40 may then continue at block 90 to determine if additional object references 16 are present in the caching data structure.

If no additional object references 16 are present in the caching data structure, then the JVM 40 may determine at block 96 if additional caching data structures are present. If so, then the JVM 40 may load a next caching data structure for processing at block 84. Alternatively, when there are no additional caching data structures to process, the JVM 40 may return to normal operation at block 98.

In operation, embodiments consistent with the invention address the needs of high performance caches and other applications that do not lend themselves well to conventional garbage collection. Many customers want to cache large amounts of data, but garbage collection time is directly related to the number of live objects on an object heap 46. So if a customer has a very large data cache with a lot of data (and therefore a lot of live objects in it), their garbage collection pause times may be very long (one to several seconds.) When pause times of this length occur rapidly, the performance of the application can suffer or even grind to a halt. In situations where a long pause is infrequent, it may not affect overall throughput much. However, many customers may still experience period of poor response times and low quality of service that may be unacceptable for their application.

While generational garbage collection and other heap partitioning methods can reduce the number of garbage collections, such schemes may not work for write-through cache applications, among others. In a write-through cache application, every write to the cache may cause a synchronous right to the backing store. While many objects in a write-through cache may be long-lived by Java standards (several minutes or more old), the data may eventually get overwritten. When this happens, the tenured, or old, generation part of the object heap 46 where garbage collection was being avoided will eventually get garbage collected. Once the JVM 40 has to iterate the tenured, or old, generation, garbage collection pauses can become significant and performance will suffer. Even real time garbage collectors cannot eliminate interruptions. Such algorithms rarely know enough information about the behavior of the application. Moreover, real time applications are usually very deterministic and usually fairly small and simple compared to middleware, so these behavior limits may be easier to determine. Virtual machines, and embodiments of the invention realized in virtual machines, are well suited for use in middleware. Middleware is software that mediates between an applications program and a network.

While the present invention has been illustrated by a description of various embodiments and while these embodiments have been described in considerable detail, it is not the intention of the Applicants to restrict, or, in any way limit the scope of the appended claims to such detail. For instance, because the Java object-oriented computing environment is well understood and documented, many aspects of the invention have been described in terms of Java and Java-based concepts. However, the Java and Java-based concepts are used principally for ease of explanation. The invention is not limited to interactions with a Java object-oriented computing environment. The invention in its broader aspects is therefore not limited to the specific details, representative apparatus and method, and illustrative example shown and described. Accordingly, departures may be made from such details without departing from the spirit or scope of Applicants' general inventive concept.

What is claimed is:

1. A computer implemented method of deallocating an object from a tenured space of a memory heap, the method comprising:
collecting statistical trend information over a period of time for a plurality of objects and associated object references of a tenured space of a memory heap;
analyzing the statistical trend information to learn a caching pattern from the statistical trend information, wherein learning the caching pattern includes: learning of a probable cache in the tenured space of the memory heap, learning that an object reference has been assigned to an object a number of times, learning how frequently an object reference is read, learning how frequently an object pointed to by an object reference is replaced, and learning a type of object that has been assigned a number of times;
determining that a particular object of the plurality of objects of the tenured space of the memory heap is replaceable using the learned caching pattern;
tagging an object reference pointing to the particular object as replaceable to indicate that the particular object is replaceable;
decoding a command requesting an object allocation of the memory heap for a new object; and
responding to the command by:
determining that the object reference of the particular object was tagged as replaceable, wherein the object reference of the particular object was previously tagged as replaceable using the learned cache pattern;
removing the particular object from the tenured space of the memory heap; and
allocating the new object into a space within the tenured space of the memory heap from which the particular object was removed instead of a different space indicated by a freelist in response to determining that the new object can fit into the space.

2. The method of claim 1, further comprising executing a garbage collector algorithm on another object within the tenured space of the memory heap.

3. The method of claim 1, wherein determining that the particular object of the tenured space of the memory heap is replaceable using the learned caching pattern includes determining that the particular object meets a replaceable criterion.

4. The method of claim 1, further comprising enabling a user to manually tag an object reference of another object of the plurality of objects as replaceable to designate the other object as replaceable.

5. The method of claim 1, wherein collecting the statistical trend information further comprises automatically recognizing a usage of the object, wherein the usage is known to be part of an application programming interface.

6. The method of claim 1, wherein determining that the particular object of the tenured space of the memory heap is replaceable using the learned caching pattern includes determining that the particular object has no subclass.

7. The method of claim 1, further comprising removing the particular object from the tenured space of the memory heap in response to determining that the object reference of the particular object is the only object reference to the particular object.

8. The method of claim 1, wherein determining that the particular object of the tenured space of the memory heap is replaceable using the learned caching pattern includes locating at least one caching data structure in the tenured space of the memory heap.

9. The method of claim 8, wherein the object reference of the particular object that is tagged as replaceable is within the located caching data structure in the tenured space of the memory heap.

10. An apparatus, comprising:
a memory storing a plurality of objects and associated object references in a tenured space of the memory;
program code resident in the memory configured to deallocate an object from the tenured space of the memory; and
a processor in communication with the memory and configured to:
execute the program code to collect statistical trend information over a period of time for the plurality of objects and the associated object references of the tenured space of the memory, to analyze the statistical trend information to learn a caching pattern from the statistical trend information, wherein learning the caching pattern includes: learning of a probable cache in the tenured space of the memory, learning that an object reference has been assigned to an object a number of times, learning how frequently an object reference is read, learning how frequently an object pointed to by an object reference is replaced, and learning a type of object that has been assigned a number of times,
determine that a particular object of the plurality of objects of the tenured space of the memory is replaceable using the learned caching pattern,
to tag an object reference pointing to the particular object as replaceable to indicate that the particular object is replaceable, to decode a command requesting an object allocation of the memory for a new object, and
respond to the command by:
determining that the object reference of the particular object was tagged as replaceable, wherein the object reference of the particular object was previously tagged as replaceable using the learned cache pattern,
removing the particular object from the tenured space of the memory, and
allocating the new object into a space within the tenured space of the memory from which the particular object was removed instead of a different space indicated by a freelist in response to determining that the new object can fit into the space.

11. The apparatus of claim 10, wherein the processor is further configured to allocate the new object into the space within the tenured space of the memory from which the particular object was removed in response to determining that the new object can fit into the space.

12. The apparatus of claim 10, wherein the processor is further configured to execute a garbage collector algorithm on another object of the plurality of objects within tenured space of the memory.

13. The apparatus of claim 10, wherein the processor is further configured to enable a user to manually tag an object reference of another object of the plurality of objects as replaceable to designate the other object as replaceable.

14. The apparatus of claim 10, wherein the processor is further configured to determine that the particular object of the tenured space of the memory is replaceable using the learned caching pattern by determining that the particular object has no subclass.

15. The apparatus of claim 10, wherein the processor is further configured to determine that the particular object of the tenured space of the memory is replaceable using the learned caching pattern by determining that the particular object meets a replaceable criterion.

16. The apparatus of claim 10, wherein the processor is further configured to determine that the particular object of the tenured space of the memory is replaceable using the learned caching pattern by locating at least one caching data structure in the tenured space of the memory.

17. The apparatus of claim 16, wherein the object reference of the particular object that is tagged as replaceable is within the located caching data structure in the tenured space of the memory.

18. A program product, comprising:
program code configured to deallocate an object from a tenured space of a memory heap, wherein the program code is configured to collect statistical trend information over a period of time for a plurality of objects and associated object references of the tenured space of the memory heap, to analyze the statistical trend information to learn a caching pattern from the statistical trend information, wherein learning the caching pattern includes: learning of a probable cache in the tenured space of the memory heap, learning that an object reference has been assigned to an object a number of times, learning how frequently an object reference is read, learning how frequently an object pointed to by an object reference is replaced, and learning a type of object that has been assigned a number of times, to determine that a particular object of the plurality of objects of the tenured space of the memory heap is replaceable using the learned caching pattern, to tag an object reference pointing to the particular object as replaceable to indicate that the particular object is replaceable, to decode a command requesting an object allocation of the memory heap for a new object, and to respond to the command by: determining that the object reference of the particular object was tagged as replaceable, wherein the object reference of the particular object was previously tagged as replaceable using the learned cache pattern, removing the particular object from the tenure space of the memory heap, and allocating the new object into a space within the tenured space of the memory heap from which the particular object was removed instead of a different space indicated by a freelist in response to determining that the new object can fit into the space; and
a non-transitory computer readable medium bearing the program code.

19. The program product of claim 18, wherein the program code is further configured to determine that the particular object of the tenured space of the memory heap is replaceable using the learned caching pattern by determining that the particular object meets a replaceable criterion.

20. The program product of claim 18, wherein the program code is further configured to locate a caching data structure in the tenured space of the memory heap.

* * * * *